(12) United States Patent
Iwata et al.

(10) Patent No.: US 8,732,594 B2
(45) Date of Patent: May 20, 2014

(54) INFORMATION PROCESSING DEVICE

(75) Inventors: Takahiro Iwata, Yokohama (JP);
Masato Suzuki, Yokohama (JP); Hiroki Miyamoto, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1556 days.

(21) Appl. No.: 11/772,841

(22) Filed: Jul. 3, 2007

(65) Prior Publication Data

US 2008/0016447 A1 Jan. 17, 2008

(30) Foreign Application Priority Data

Jul. 3, 2006 (JP) .................... 2006-182948

(51) Int. Cl.
*G06F 3/00* (2006.01)

(52) U.S. Cl.
USPC ........... 715/760; 715/734; 715/737; 715/738; 715/841

(58) Field of Classification Search
USPC .......................... 715/734, 737, 738, 760, 841
See application file for complete search history.

(56) References Cited

U.S. PATENT DOCUMENTS

| | | | |
|---|---|---|---|
| 5,892,935 A | 4/1999 | Adams | |
| 6,522,342 B1 * | 2/2003 | Gagnon et al. | 715/716 |
| 6,572,662 B2 * | 6/2003 | Manohar et al. | 715/273 |
| 2002/0116392 A1 | 8/2002 | McGrath et al. | |
| 2003/0177501 A1 * | 9/2003 | Takahashi et al. | 725/110 |

FOREIGN PATENT DOCUMENTS

| | | |
|---|---|---|
| JP | 2001-209571 | 8/2001 |
| JP | 2003-143642 | 5/2003 |
| JP | 2003-284029 | 10/2003 |
| JP | 2005-31829 | 2/2005 |
| JP | 2005-165651 | 6/2005 |

OTHER PUBLICATIONS

Office Action issued in Japanese Patent Application No. 2006-182948 on Mar. 22, 2011.

* cited by examiner

*Primary Examiner* — Andrey Belousov
(74) *Attorney, Agent, or Firm* — Antonelli, Terry, Stout & Kraus, LLP.

(57) ABSTRACT

An information processing device includes: an information acquisition process control unit for selecting an information piece to be selected and sending an instruction to a communication unit; the communication unit for transmitting an information acquisition request to other information processing device connected via a network, and acquiring information from the other information processing device according to the instruction; and a storage unit storing a display amount information indicating the amount of display information which can be displayed on a display unit at once. The information acquisition process control unit instructs the communication unit to acquire more information than the amount indicated by the display amount information. This realizes an effective information acquisition and appropriate user-friendliness.

1 Claim, 12 Drawing Sheets

FIG. 5

16 SCREEN CONFIGURATION INFORMATION MANAGING TABLE

| 501 | 502 | 503 | 504 | 505 |
|---|---|---|---|---|
| SCREEN CONFIGURATION | DISPLAY FORMAT | NUMBER OF INFORMATION PIECES | LIST DISPLAY ITEM | DETAILED INFORMATION DISPLAY ITEM |
| SCREEN CONFIGURATION A | TEXT LIST | 7 PIECES | TITLE | TITLE, GENRE, RECORDING DATE AND TIME, STORAGE FORMAT, BIT RATE |
| SCREEN CONFIGURATION B | THUMBNAIL LIST | 6 PIECES | TITLE THUMBNAIL | TITLE, GENRE, RECORDING DATE AND TIME, STORAGE FORMAT, BIT RATE, RESOLUTION |

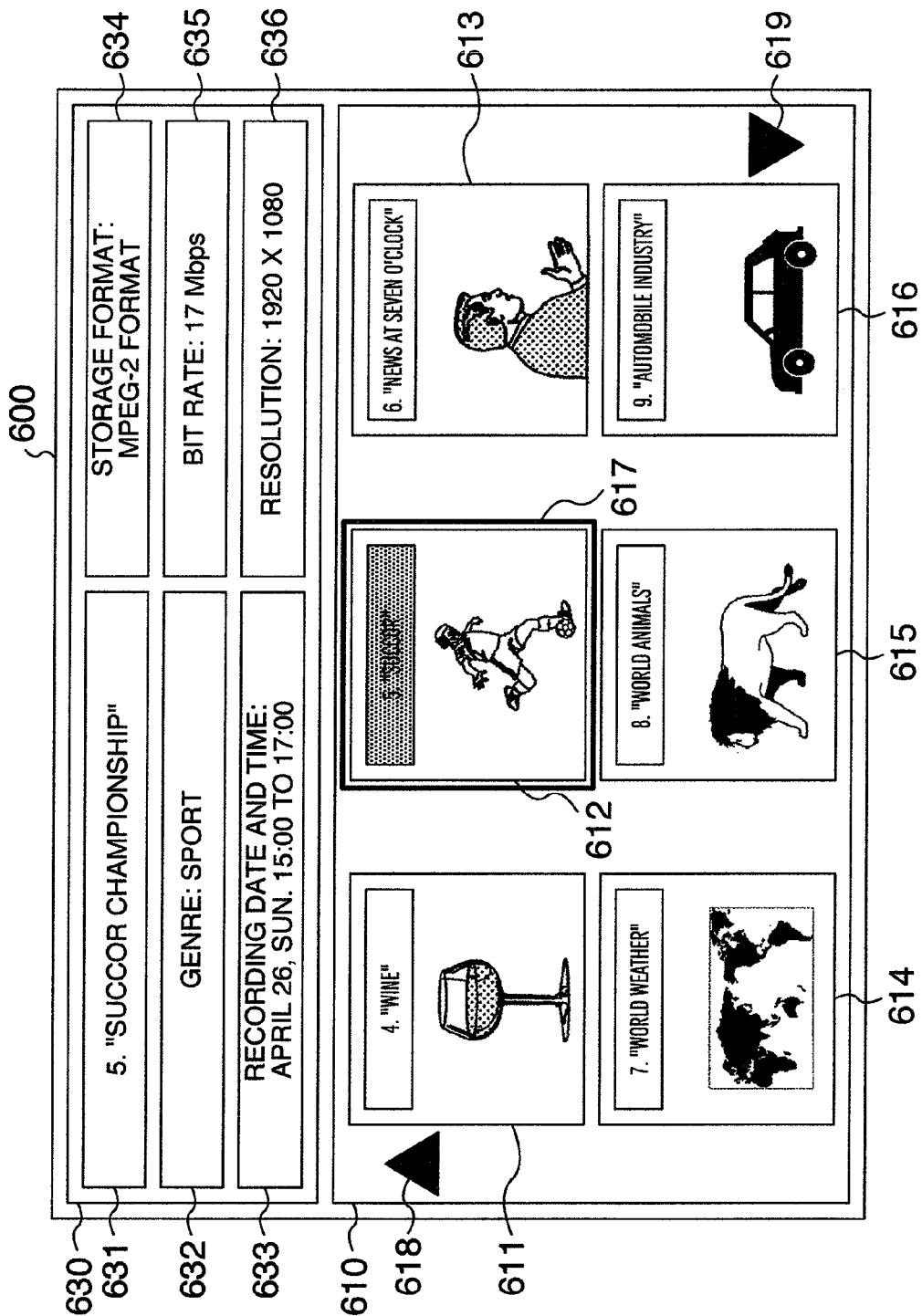

FIG. 7

15 INFORMATION ACQUISITION PROCESS MANAGING TABLE

| 701 | 702 | 703 | 704 | 705 | 706 | 707 |
|---|---|---|---|---|---|---|
| DISPLAY STATE/ SIGNAL | OBJECT INFORMATION | ID | ACQUISITION START POSITION | NUMBER OF INFORMATION PIECES | ACQUISITION COMPLETE FLAG | DATA STORAGE DESTINATION |
| BEING DISPLAYED | CONTENT LIST | ID1 | 8 | 7 | Y | p1 |
| SCROLL 1 | CONTENT LIST | ID1 | 1 | 7 | N | p2 |
| SCROLL 2 | CONTENT LIST | ID1 | 15 | 7 | N | p3 |
| BEING DISPLAYED | DETAILED INFORMATION 1 | ID9 | 8 | 1 | Y | p4 |
| SELECTION 1 | VIDEO DATA | ID7 | 1 | 1 | N | p5 |
| DIRECT BUTTON 1 | CONTENT LIST | ID4 | 1 | 7 | N | p6 |
| SCREEN SWITCHING | DETAILED INFORMATION 2 | ID8 | 1 | 1 | N | p7 |
| | | | | | | |

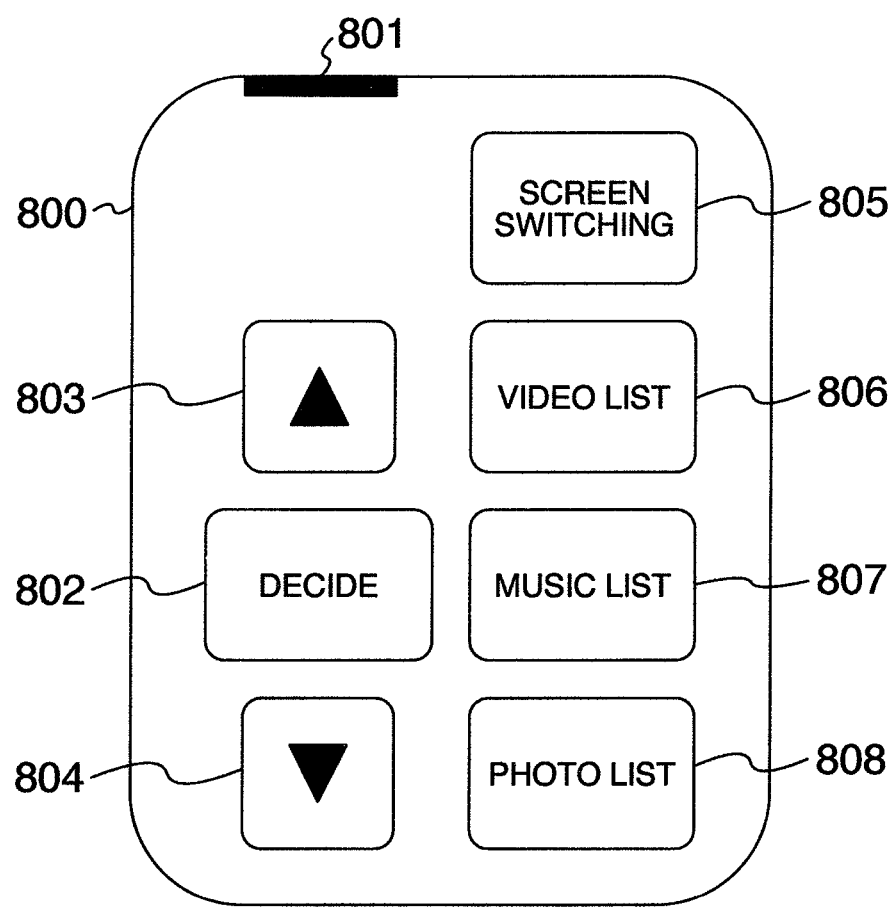

FIG. 9

17 CURRENT SCREEN DISPLAY INFORMATION MANAGING TABLE

| DISPLAY AREA 901 | CURRENT DISPLAY ID 902 | DISPLAY CONTENTS 903 | FORMAT 904 | SCREEN CONFIGURATION UPON SELECTION 905 | DISPLAY ID UPON SELECTION 906 |
|---|---|---|---|---|---|
| AREA 1 | ID1 | "Video" | TEXT | SCREEN A | ID4 |
| AREA 2 | ID1 | "Audio" | TEXT | SCREEN A | ID5 |
| AREA 3 | ID1 | "Photo" | TEXT | SCREEN A | ID6 |
| AREA 4 | ID2 | "REPRODUCE ALL DATA" | THUMBNAIL | SCREEN B | ID7 |
| AREA 5 | ID3 | "NEW DATA" | TEXT | SCREEN B | ID9 |
| | | | | | |

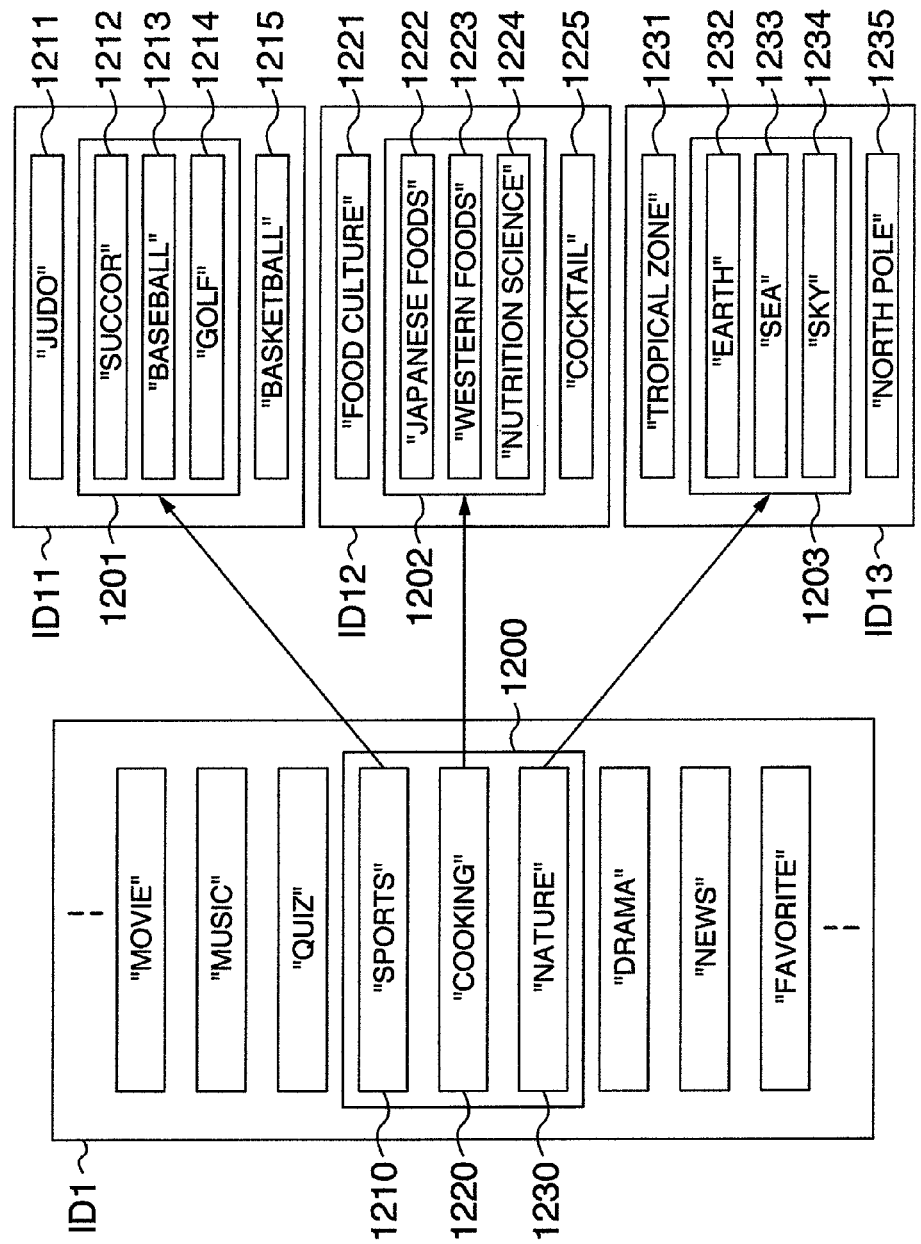

INFORMATION PROCESSING DEVICE

INCORPORATION BY REFERENCE

The present application claims priority from Japanese application JP 2006-182948 filed on Jul. 3, 2006, the content of which is hereby incorporated by reference into this application.

BACKGROUND OF THE INVENTION

The present invention relates to an information processing device which acquires information from other information device via a network.

A conventional technique relating to a device for selecting an information piece in advance, according to user's information and storing it is disclosed, for example, in JP-A-2003-143642.

SUMMARY OF THE INVENTION

However, the information reception device disclosed in JP-A-2003-143642 only receives all the information pieces and accumulates information pieces selected from information pieces received upon storage. Thus, no selection or reduction of information pieces received by the information reception device is performed. Accordingly, a transmission side should transmit all the information pieces and information transmission means for inputting the information pieces into the device should have a large transmission capability. Moreover, when a large amount of information should be received by the device, a plenty of unnecessary information should also be received in advance when the amount of necessary information is small. This requires a long time for reception and causes a delay of displaying the information, which lowers the user-friendliness.

It is therefore an object of the present invention to provide a technique for realizing an effective information acquisition and an appropriate user-friendliness.

In order to achieve the aforementioned object, the present invention provides a technique as follows. That is, an information processing device according to the invention is connected to other information processing device via a network and comprises: a display unit; a storage unit; an information acquisition process control unit; and a communication unit; wherein the storage unit holds screen configuration information concerning arrangement of information pieces displayed on the display unit; the information acquisition process control unit transmits to the communication unit, a signal instructing acquisition of an information piece selected by referencing the screen configuration information among information pieces not displayed on the display unit; and the communication unit acquires the information piece selected from the other information processing device by the instruction signal.

With the aforementioned configuration, it is possible, for example, to select and acquire in advance an information piece not displayed on the display unit. Thus, it is possible to reduce an information amount to be received as compared to a case when receiving information without performing selection, thereby reducing the load on the transmission capability of transmission means and preventing a delay of an information process.

According to another aspect of the invention, the information processing device is connected to other information processing device via a network and also connected to a display device, and comprises: a storage unit; an information acquisition process control unit; and a communication unit; wherein the storage unit holds screen configuration information concerning arrangement of information pieces displayed on the display unit; the information acquisition process control unit transmits to the communication unit, a signal instructing acquisition of an information piece selected by referencing the screen configuration information among information pieces not displayed on the display unit; and the communication unit acquires the information piece selected from the other information processing device by the instruction signal.

With the aforementioned configuration, it is possible, for example, to select and acquire in advance an information piece not displayed on the connected display unit. Thus, it is possible to reduce an information amount to be received as compared to a case when receiving information without performing selection, thereby reducing the load on the transmission capability of transmission means and preventing a delay of an information process.

According to the present invention, it is possible to realize user-friendly and effective information acquisition.

Other objects, features and advantages of the invention will become apparent from the following description of the embodiments of the invention taken in conjunction with the accompanying drawings.

BRIEF DESCRIPTION OF THE DRAWINGS

FIG. 5 is an explanatory diagram showing an example of a screen structure information managing table according to the embodiment of the present invention.

FIG. 6 is an explanatory diagram showing an example of a display screen according to the embodiment of the present invention.

FIG. 7 is an explanatory diagram showing an example of a screen structure information managing table according to the embodiment of the present invention.

FIG. 8 is an explanatory diagram showing an example of a controller according to the embodiment of the present invention.

FIG. 9 is an explanatory diagram showing an example of a current display information managing table according to the embodiment of the present invention.

FIG. 12 is an explanatory diagram showing an example of a look-ahead object according to another embodiment of the present invention.

DESCRIPTION OF THE EMBODIMENTS

Description will now be directed to embodiments of the present invention with reference to the attached drawings.

Referring to FIG. 1 to FIG. 11, explanation will be given on a first embodiment of the present invention.

Figure 1:
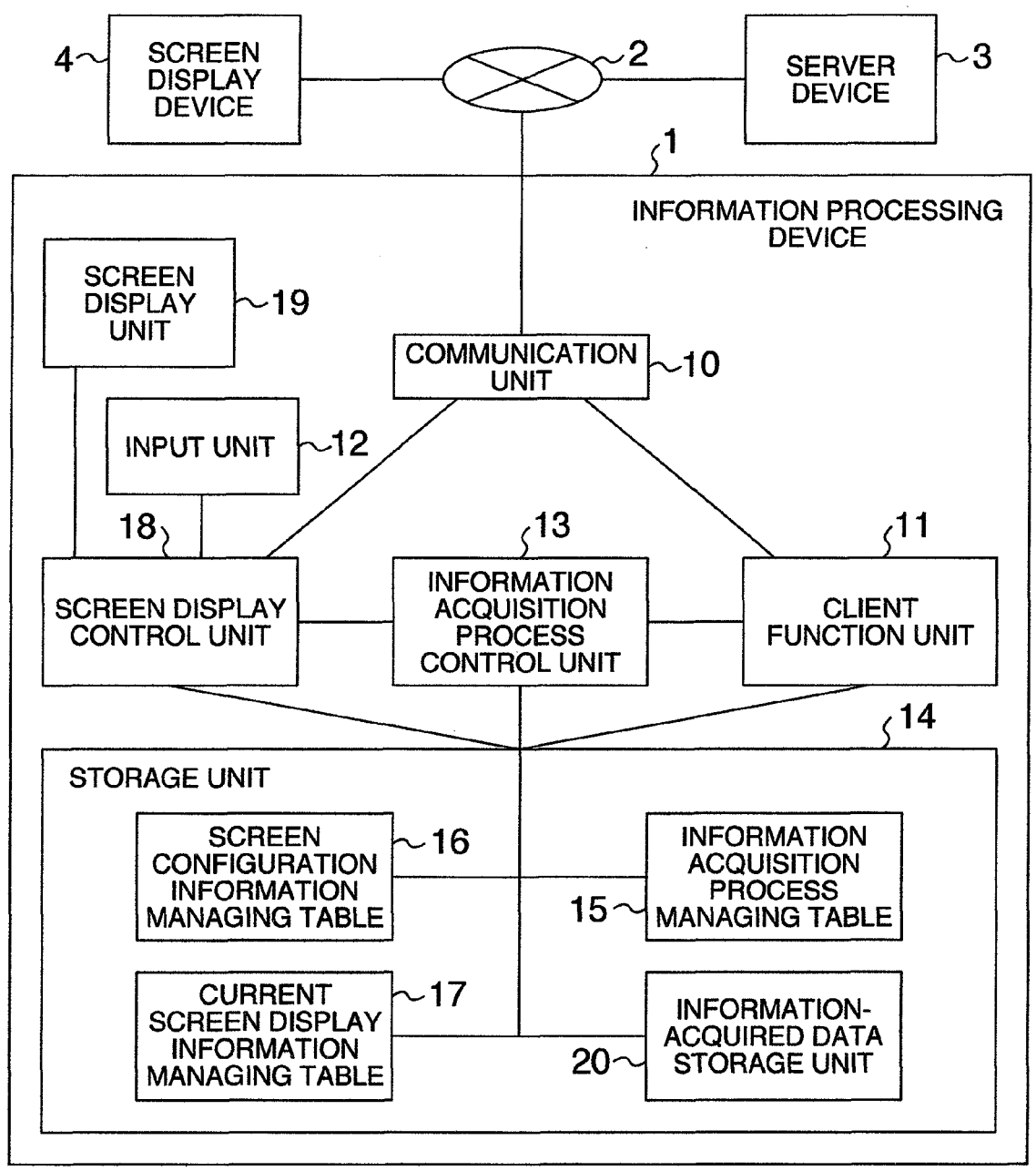
FIG. 1 is a block diagram showing an example of an information processing device according to an embodiment of the present invention.

In the first embodiment, an explanation will be given on a case that an information processing device having a client function acquires content data such as text data, video data, audio data, software, and a list of them. FIG. 1 is a block diagram showing a block configuration example of the information processing device according to the first embodiment.

FIG. 1 shows an information processing device 1, an information transmission network 2, server device 3, a screen display device 4, a communication unit 10 connected to the information transmission network for performing communication with a device connected to the information transmission network, a client function unit 11, an input unit 12, an information acquisition process control unit 13, a storage unit 14, an information acquisition process managing table 15, an information-acquired data storage unit 20, a screen configuration information managing table 16, a current screen display information managing table 17, a screen display control unit 18, and a screen display unit 19.

The information processing device 1 acquires information such as a list of data generated/managed by the server device 3, via the communication unit 10. The list may be, for example, a list of contents such as text data, video data, audio data, and software held in the server device 3. The data acquisition is executed by the client function control unit 11 which accesses the server device 3 via the communication unit 10 under control of the information acquisition process control unit 13. The acquired data is stored in the information-acquired data storage unit 20 after updating the information acquisition process managing table 15 in the storage unit 14.

The information transmission network 2 may be, for example, a network formed by a wired LAN, a wireless LAN, UWB (Ultra Wide Band), Bluetooth, IEEE 1394, Z power line, or a combination of them or a combination of them with a broadcast. Between devices connected to the information transmission network 2, information can be transferred according to a predetermined procedure.

The server device 3 has a function for transmitting information upon an information acquisition request from the client function 11 of the information processing device 1 via the information transmission network 2.

The information acquisition process control unit 13 performs scheduling of the information acquisition processing by referencing the information acquisition process managing table 15 held in the storage unit 14 and transmits information acquisition process instruction information to the client function unit 11.

The client function unit 11 receives the instruction information and issues to the communication unit 10, an execution permission of the request for transmitting information to the server device 3. The communication unit 10 transmits the information transmission request to the server device 3 via the information transmission network 2.

The storage unit 14 is formed, for example, by bridge medium such as an HDD, a memory, and a memory card.

The information acquisition process managing table 15 manages information indicating an information acquisition object and whether the object information has been acquired.

The information-acquired data storage unit 20 stores information acquired by the information acquisition process control unit 13 which uses the client function unit 11.

The screen configuration information managing table 16 stores information concerning arrangement of information displayed such as a screen configuration when information is displayed on the display screen.

The current screen display information managing table 17 manages information concerning the current display screen.

The screen display control unit 18 reads information required for display of the screen display unit 19 from the storage unit 14 and generates display screen information. If no information to be read in exists, the screen display control unit 18 writes into the information acquisition process managing table 15 that information is required and reports it to the information acquisition process control unit 13.

The screen display unit 19 is an output unit of the information processing device 1 and receives display screen information generated by the screen display control unit 18 and displays it on the screen.

Next, referring to FIG. 2 explanation will be given on an example of a display content of the display screen owned by the screen display unit 19 of the present embodiment. A reference symbol 200 denotes an area of the display screen. 210 denotes a display area of the content list. 211 to 217 denote a display area of respective information pieces of the content list. Moreover, 218 and 219 denote marks indicating the directions where the content lists not displayed on the area 210 exist.

Figure 2:
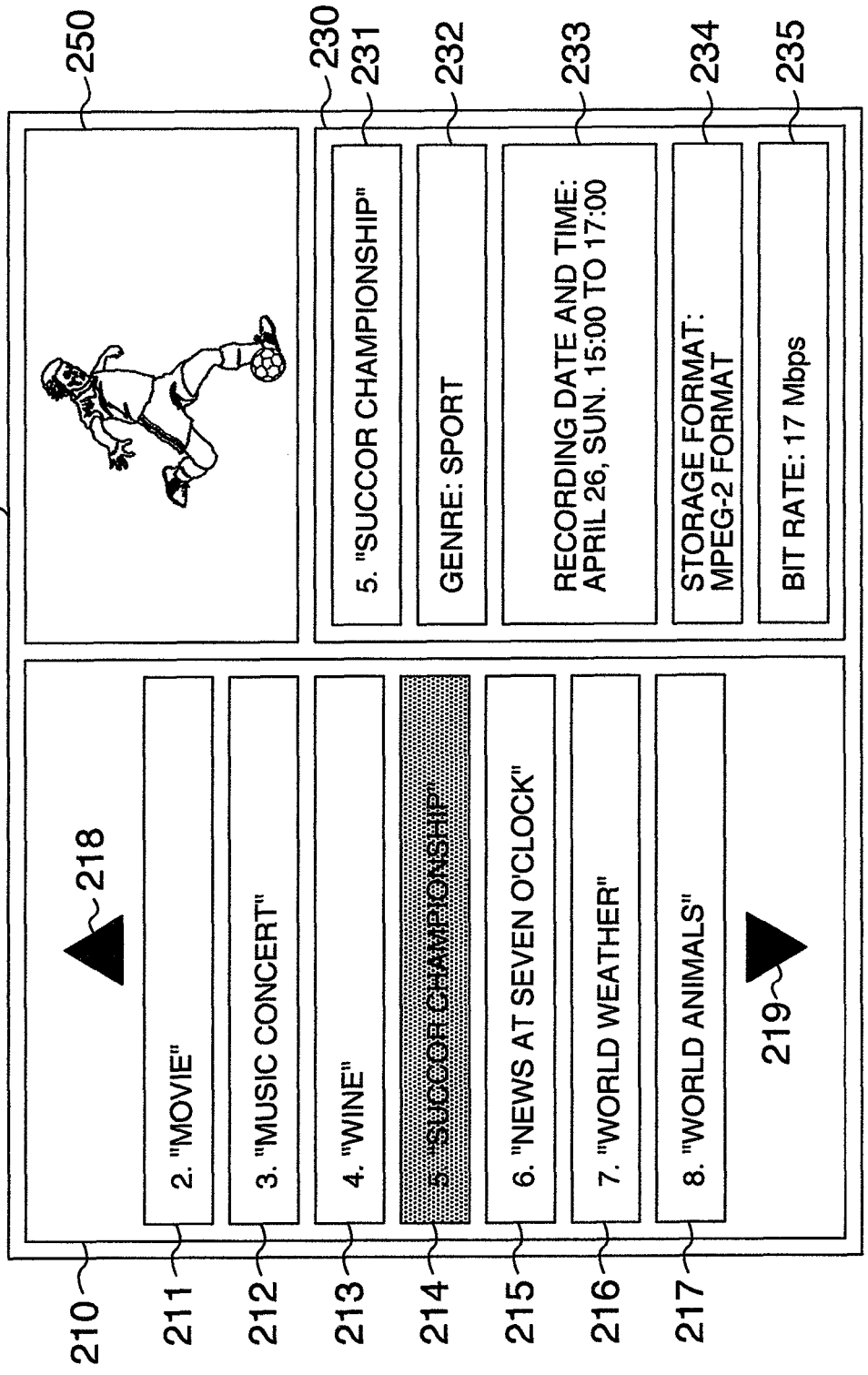
FIG. 2 is an explanatory diagram showing an example of a display screen according to the embodiment of the present invention.

It should be noted that in the example of FIG. 2, the area of 214 is displayed by a color different from other areas so as to indicate that information on the current area 214 is selected. According to the information inputted from the input unit 12, the selected display area may be shifted from one to another information display area 211 to 217 of the content list. Moreover, it is also possible to fix the selected area to 214 while information indicated in the respective display areas 211 to 217 are scrolled in the direction shown by 218 or 219. The display modification may be performed by the screen display control unit 18 which modifies the display screen information according to the input signal inputted from the input unit 1.

Moreover, 250 denotes an area for displaying image data concerning a content indicated by the information selected by the area 210. 230 denotes an area for displaying detailed information concerning the content indicated by the information selected by the area 210. Here, in this embodiment, the area 250 displays a thumbnail display of one scene concerning a video content but it may also display an image, for example, concerning an audio content. Here, in this embodiment, the area 231 displays a title of the content; the area 232 displays a genre of the content; the area 233 displays the date when the content was recorded; the area 234 displays the storage format of the content; and the area 235 displays the bit rate of the content recorded. It should be noted that the area 230 may be used to display other information concerning the content.

Figure 3:
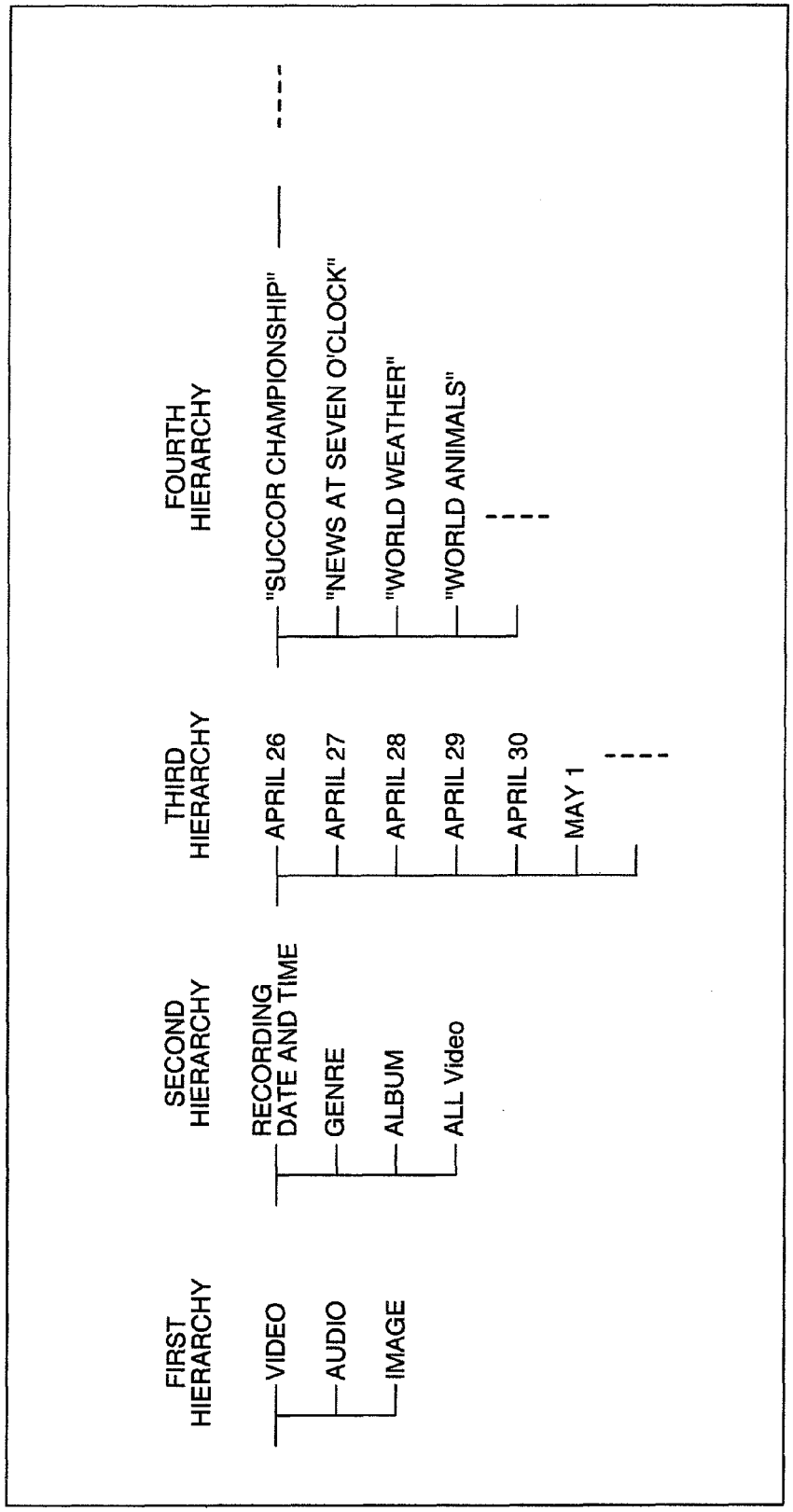
FIG. 3 is an explanatory diagram showing an example of a hierarchical structure of list information according to the embodiment of the present invention.

Here, in this embodiment, the respective information pieces shown in FIG. 2, are arranged in a hierarchical structure of concepts as shown in FIG. 3, for example. Here, in FIG. 3, each hierarchy of the hierarchical structure is formed by a list of information pieces. One information piece of a list of each hierarchy is further correlated to a list of a lower hierarchy. The list of the lowest hierarchy contains, for example, video data and audio data used by a user at the last stage and content data such as text data and software. In the example of FIG. 3, the list of the first hierarchy indicates the content type, i.e., whether the content is video data, audio data, or image data. The list of the second hierarchy is correlated to an information piece of the first hierarchy. In this example, the information piece "video" in the list of the first hierarchy is correlated to a list of detailed information on the content such as the recording date and time and the genre and a parameter. Furthermore, the information piece "recording date and time" contained in the list of the second hierarchy is correlated to a list of dates indicating April 26, April 27, and the like in the third hierarchy. Moreover, the information piece "April 26" in the third hierarchy is correlated to a list of titles of contents recorded on that day. Moreover, each title of the contents in the fourth hierarchy is correlated to information concerning data itself on the content such as video data, the content storage destination, other information on the content. Each of the information pieces not mentioned above also has a list of a lower hierarchy.

In this embodiment, assume that the content list of areas 211 to area 217 displayed of the area 210 in the display screen of FIG. 2 is a list of a particular hierarchy of the hierarchical structure in FIG. 3. Here, the information pieces displayed in the area 250 and area 230 are information pieces contained, for example, in a list lower than that list of the hierarchical structure of FIG. 3.

Here, the information pieces shown in FIG. 2 are acquired by the information processing device 1 via the information transmission network 2 from the server device 3 and are displayed. For this, in the example FIG. 2, among the content lists of the hierarchies displayed in the display area 210, those portions which cannot be put into the area 211 to the area 217 are not displayed. These portions are displayed in the areas 211 to 217 when the aforementioned scroll movement is performed according to the input signal from the input unit 1. For this, the new information pieces to be displayed should be acquired from the server device and stored in the information-acquired data storage unit 20 or already stored in the information-acquired data storage unit 20.

Here, when acquiring a new information piece from the server device 3, a delay is caused when the communication unit 10 receives data via the information transmission network 2 from the server device 3 and displays it on the display screen. Accordingly, a user is frustrated by the screen display speed.

Moreover, when storing a new information piece already acquired in the information-acquired data storage unit 20, it is possible to apply a method for acquiring all the information pieces of the same hierarchy of the list displayed in the area 211 to the area 217 of FIG. 2. However, in this method, if the list of the same hierarchy includes a large number of information pieces, the acquisition of the information pieces itself requires a long time. Accordingly, a delay is caused until display on the display screen and the user is frustrated by the image display speed. Moreover, a load is applied to the information transmission capability of the information transmission network 2.

To cope with this, the information processing device of the present invention selectively receives a necessary information piece upon so as to reduce the delay until the information piece is displayed on the display screen and reduce the load on the information transmission of the information transmission network. This will be detailed below.

Figure 4:
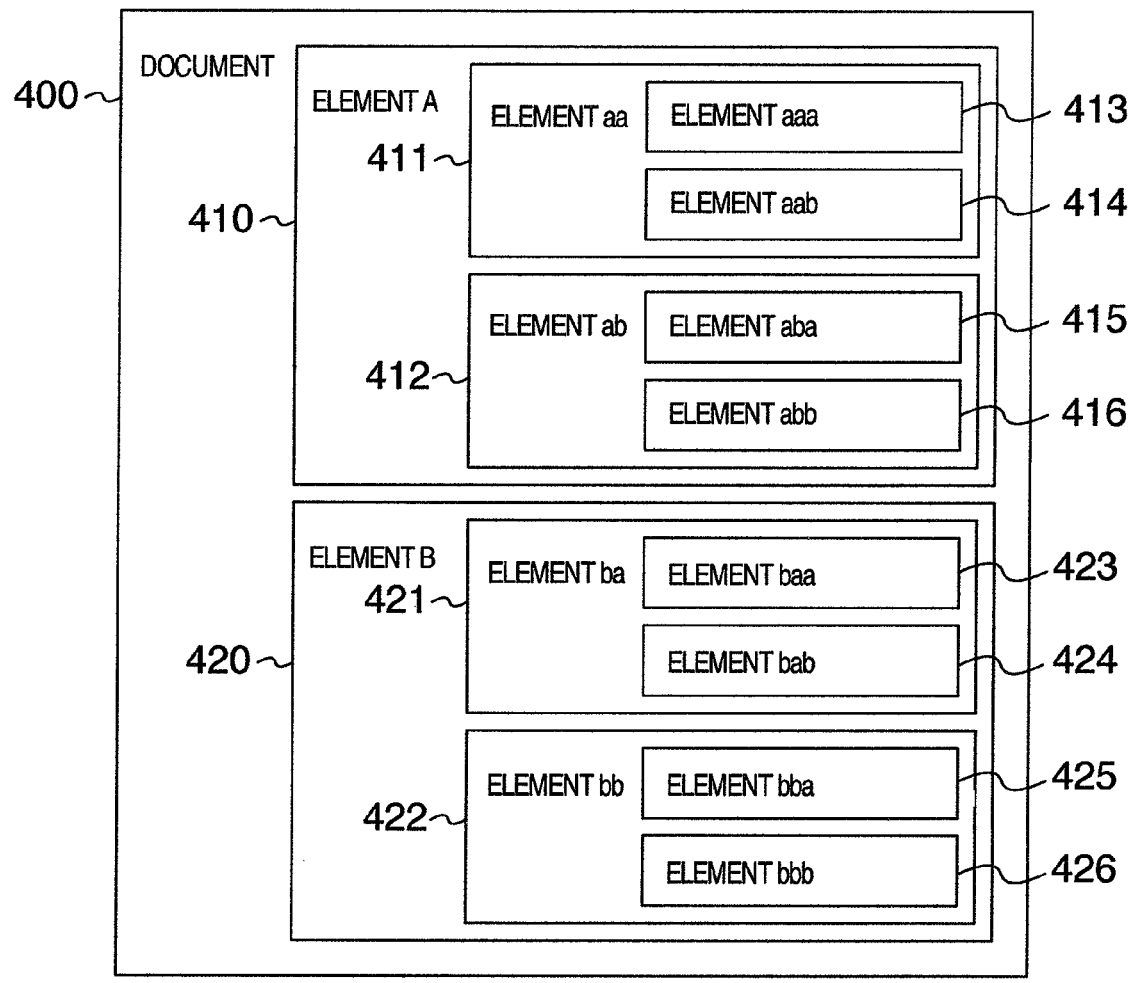
FIG. 4 is an explanatory diagram showing an example of a document structure according to the embodiment of the present invention.

Firstly, referring to FIG. 4, explanation will be given on the data structure of the information received by the information processing device 1 of the present embodiment.

The information processing device 1 in the present embodiment uses information described in a markup language as information received from the server device 3. FIG. 4 shows a data structure of the information. 400 denotes a document described by the markup language. 410-416, 420-426 denote elements containing the information in the document. Here, the element A410 includes an element aa411 and an element ab412; the element aa411 includes an element aaa413 and an element aab414. The other elements also includes other elements as shown in FIG. 4. Thus, the description document information can store information in a hierarchical structure. The information processing device 1 in the present embodiment receives the information in the hierarchical structure shown in FIG. 3 as description language document information in FIG. 4.

Moreover, this embodiment uses, as the document information, those which can set the element type of the element in the markup language document. For example, each of the elements shown in FIG. 4 is defined by generating a unique ID for each of them., it is possible to specify a particular element in the data of the document and handle only that information. Accordingly, it is possible to use, for example, an XML document or a BML document as the description language document information. In these cases, the setting of the element type may be performed by setting an ID for a tag and specify the set ID when selecting information.

It should be noted that since the content management structure is to be managed by the server device, the hierarchical structure may be different from the one shown in FIG. 2. For example, it is also to use only one hierarchy where all the contents are handled. In this case, ID may be assigned for each of the contents.

Next, explanation will be given on a method how the information acquisition process control unit 13 of the information processing device 1 selects necessary information.

Firstly, explanation will be given on the screen configuration information managing table 16 managing the type and the amount of information which can be displayed on the display screen. FIG. 5 shows an example of the table configuration of the screen configuration information managing table 16. The screen configuration information managing table 16 contains items such as the type of the screen configuration displayed on the display screen by the screen display unit 19, the display format of arrangement of information, the number of display information lists in the display arrangement, and display information associated with the information list.

Here, the screen configuration type is stored in column 501. For example, the screen configuration shown in FIG. 2 is stored as screen configuration A. On the other hand, screen configuration B shown in the column 501 indicates a screen of configuration in which information pieces are displayed in different arrangement as shown in FIG. 6, for example. In screen 600 of FIG. 6, area 630 displays information corresponding to the area 230 in FIG. 2. Moreover, area 610 displays information corresponding to the area 210 in FIG. 2. However, area 610 of FIG. 6 displays information in a different way from the area 210 of FIG. 2. The area 210 of FIG. 2 is a text data arrangement where a list of contents are shown in the area 211 to the area 217. On the other hand, in the area 610 of FIG. 6, a list of contents is shown in the area 611 to the area 616 each containing a combination of a thumbnail image and text data. Here, a selected thumbnail image may be expressed by an emphasized frame such as 617. In this embodiment, the screen configuration A and the screen configuration B may be selected by the user by inputting a signal from the input unit, for example.

The screen configuration information managing table 16 of FIG. 5 contains information concerning the display information for each of the different screen configurations. For example, the column 502 contains main display formats of the information list in the respective screen configurations. The screen configuration A of FIG. 2 uses the text data format while the screen configuration B of FIG. 6 uses the thumbnail data format. Moreover, the column 503 indicates the number of information pieces which can be simultaneously displayed in the information list in the respective screen configurations. Moreover, the column 504 contains the display items of the information list indicated in the area 210 of FIG. 2 or the area 610 of FIG. 6, for example. Moreover, the column 504 contains the display item of the information list indicated in the area 210 of FIG. 2 and the area 610 of FIG. 6. Moreover, column 505 contains, for example, display items of detailed information shown in the area 230 of FIG. 2 and the area 630 of FIG. 6.

Here, the information acquisition process control unit 13 of the information processing device 1 selects information to be acquired, by referencing the information stored in the screen configuration information managing table 16.

For example, the screen configuration information managing table 16 shown in FIG. 5 shows that when displaying the display screen of the screen configuration A, the information acquisition process control unit 13 acquires from the server device 3, the number of text information pieces stored in 503 of the screen configuration information managing table 16 and the title, the genre, the recording date and time, the storage format, and the bit rate concerning one information piece selected on the screen.

Furthermore, in order to prevent the aforementioned delay of the information display, acquisition of the information currently displayed on the display screen is not enough. It is necessary to acquire the information to be displayed when the screen display is changed next, before the signal for display is inputted. That is, when displaying a screen, the information acquisition process control unit 13 of the present embodiment transmits an instruction to acquire information more than the information amount displayed on the screen, to the communication unit 10 via the client control unit 11. It should be noted that the method for acquiring in advance the information not displayed will be referred to as a look-ahead acquisition.

Next, explanation will be given on the information acquisition process managing table 15 used for managing information acquired by the information acquisition process control unit 13.

FIG. 7 shows an example of configuration of the information acquisition process managing table 15. Each line of the information acquisition process managing table 15 indicates information required for the currently display screen and the next screen to be displayed. In this embodiment, the column 701 indicates presence/absence of display of the information. Moreover, when currently not displayed, the type of the display signal for displaying the information is stored.

Here, the display signal is inputted from the input unit. For example, the signal is inputted from the controller 800 or the like shown in FIG. 1. In the example of FIG. 8, the controller 800 includes a radio transmission unit 801 transmitting a signal, a decision button 802 for confirming selection of information, direction buttons 803, 804 for scrolling the list, and a screen switching button 805 for switching the aforementioned screen configurations. In this embodiment, the radio transmission unit 801 uses radio but it may be connected by a cable. Moreover, the controller 800 may be integrated with the information processing device 1. Furthermore, a direct list change button is provided for directly switching the genre of the list displayed on the screen. The example of FIG. 8 includes a video list button 806, a music list button 807, a photograph list button 808 as the direct list change buttons. Here, for example, when the user presses the video list button 806, a signal is transmitted from the controller 800. The information processing device 1 receives the signal and switches the display to the video content information list even if the list of the currently displayed information is a music content or photograph content list. Moreover, if the user presses the video list button 806 when the currently displayed screen is not an information list but a content itself, the screen configuration is switched. For example, the screen configuration A is set in and a new list of video contents is displayed in the area 210 or the like. It should be noted that if the currently displayed list is the video content when the user presses the video list button 806, the screen may not be changed. Moreover, the information list of a default when the video content list is displayed may be displayed.

That is, in this embodiment, signals indicating information list scroll, selection, screen switching, list change, and the like are inputted from the input unit.

Here, the aforementioned signals are stored as display signals in the column 701 of the information acquisition process managing table 15 of FIG. 7. That is, "Scroll 1" and "scroll 2" stored in the column 701 in FIG. 7 indicate signals received when the direction buttons 803, 804 in FIG. 8 are pressed, respectively. "Selection 1" indicates, for example, the signal received when the decision button 802 in FIG. 8 is pressed. Moreover, "screen switching" indicates a signal received, for example, when the screen switching button 805 in FIG. 8 is pressed.

Moreover, "direct button 1" indicates a signal received, for example, when one of the direct list change buttons 806 to 807 in FIG. 8 is pressed. Moreover, "being displayed" indicates, for example that the list is currently displayed. Moreover, the list and data other than "being displayed" is, for example, an object of look-ahead acquisition.

Next, the column 702 shows objects of information to be acquired and displayed. That is, in this embodiment, the column 702 indicates whether the object information is an information list concerning the content, detailed information concerning the content, or video data of the content itself, or the like.

Moreover, the column 703 stores ID given to the list and data of the object information. The ID may be specified from the information processing device 1 by defining in advance in the server device 3 and the information processing device 1.

Moreover, the column 704 stores a start position of the part from which information is to be acquired in the list and data of the object information. The column 705 stores an amount of information to be acquired from the start position. the column 706 stores a flag indicating whether the information has been already acquired. If the flag is Y, the acquisition is complete. If the flag is N, the acquisition is not complete. Moreover, the column 707 holds information indicating the position where the data in the information-acquired data storage unit 20 of the information recording unit 4 is stored.

The information acquisition process control unit 13 updates the information acquisition process managing table 15, for example, when information to be acquired is selected or when the screen configuration is switched upon acquisition of information. Thus, the information concerning the information acquisition process is managed.

Next, explanation will be given on the current screen display information managing table 17.

FIG. 9 shows an example of the current screen display information managing table 17. The current screen display information managing table 17 is used to manage information such as a list and data displayed on the current screen. The table is updated by the information acquisition process control unit 13 upon switching the screen configuration based on the information in the aforementioned screen configuration information managing table 16. According to the screen configuration information managing table 16, the information acquisition process control unit 13 assigns areas in the current display screen where the list and data acquired before the switching of the screen configuration are to be displayed. According to the assignment result, the information acquisition process control unit 13 stores setting information in the current screen display information managing table 17.

Here, the column 901 of setting information in the current screen display information managing table 17 stores information indicating the area where information is displayed. The area is an area where information contained in the list and information such as a content is displayed. For example, the area may be areas 211 to 217, area 250, areas 231 to 235 in FIG. 2 and areas 611 to 616, areas 631 to 636 in FIG. 6. As shown in FIG. 2 and FIG. 6, in the respective areas, information such as a text and a thumbnail are displayed. Moreover, ID of the lists containing the display information are stored in the column 902 in FIG. 9. Moreover, the contents of the display information are stored in the column 903. Moreover, the display format of the display information is stored in the column 904. Moreover, column 905 stores screen configurations switched upon selection of the display information. Moreover, column 906 stores ID of the list and data displayed in the screen configuration after switched.

For example, in the example of the display area 1 in FIG. 9, the display area 1 of the display screen displays text data "Video" among the information contained in the list of ID 1. Moreover, when this is selected by an input signal by a user, the display screen configuration is switched to the screen configuration A. Moreover, in the switched screen, information on the list of ID 4 is displayed. Hereinafter, the information such as a list displayed when the current display information is selected will be referred to "linked information" or "link destination information".

Thus, by using the current screen display information managing table 17, it is possible to manage information displayed in the respective areas of the current display screen, ID of the lists contained information, ID of the list and data displayed when the information is selected, and the like.

Next, explanation will be given on an example of process flow when acquiring a content list accumulated in the server device 3 by look-ahead in this embodiment.

Figure 10:
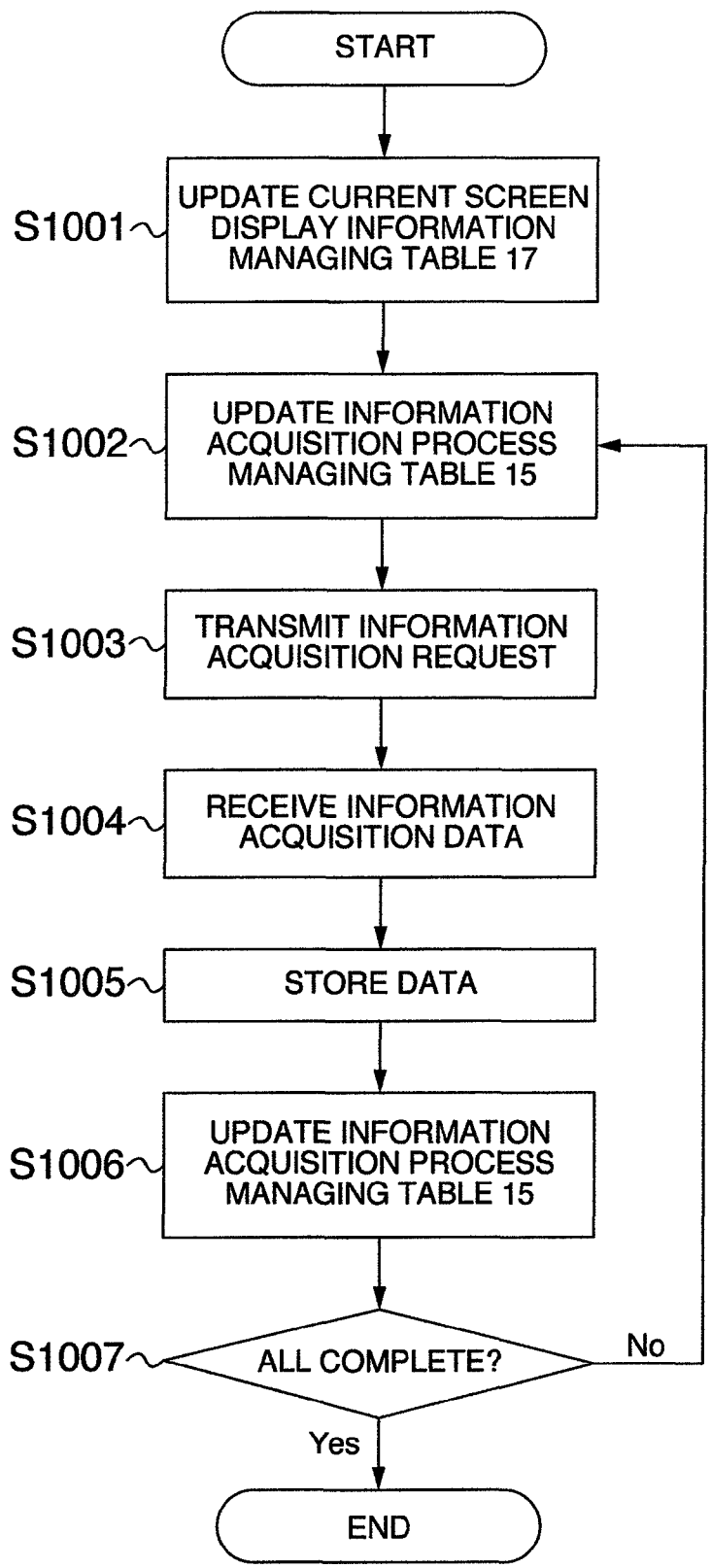
FIG. 10 is a flowchart showing an example of an information acquisition process according to the embodiment of the present invention.

FIG. 10 shows a flow of processes performed for acquiring by look-ahead, a content list accumulated in the server device when modifying information displayed on the current display screen or the screen configuration.

Firstly, the flowchart of FIG. 10 is started by inputting a screen modification signal, an information selection confirmation signal, a direction selection signal, or the like from the input unit. These signals are inputted, for example, by pressing the buttons of the controller 800 in FIG. 8.

Next, in S1001, the information acquisition process control unit 13 acquires information concerning the screen configuration currently selected, from the screen configuration information managing table 16 according to the inputted signal, stores by using them, the information displayed in the respective areas of the current display screen, the ID of the list contained in the information, the list displayed when the information is selected, data ID, and the like, in the current screen display information managing table 17, and updates them.

Next, in S1002, the information acquisition process control unit 13 selects information concerning the list or data of the information to be displayed next based on the list or data of the information currently displayed and stored in the current screen display information managing table 17, and a user input signal on the current display. Information concerning the selected information is stored in the information acquisition managing table 15 and updated. The information to be stored here is the information described in the explanation of the information acquisition managing table. Here, the received information sets to acquisition complete flag to "Y" and information not yet received sets the acquisition complete flag to "N".

In S1003, the information acquisition process control unit 13 acquires information acquisition parameters such as the acquisition object ID, the acquisition start position, the number of information pieces, and the data storage destination for the acquisition object for which the look-ahead acquisition complete flag is "N" in the information acquisition management table 15. It should be noted that the data storage destination may be set in advance or at this moment in this embodiment. The information acquisition process control unit 13 transmits the information acquisition parameter together with an information acquisition instruction to the client function unit 11. The client function control unit 11 transmits the information acquisition instruction to the communication unit 10. The communication unit 10 transmits the information acquisition parameter and the information acquisition request to the server device 3 via the information transmission network.

In step S1004, in response to the request, the server device 3 transmits data such as a requested list via the information transmission network 2. The communication unit 10 receives the data.

In S1005, the communication unit 10 transmits the acquired data to the client function unit 11. The client function unit 11 transmits the data to the information acquisition process control unit 13. The information acquisition process control unit 13 stores the data in the information-acquired data storage unit 20.

In S1006, the information acquisition process control unit 13 updates the look-ahead acquisition complete flag of the information acquisition managing table 15 to "Y" for the information whose acquisition is completed.

In S1007, the information acquisition process control unit 13 checks the information acquisition managing table 15. Here, the information acquisition process control unit 13 judges whether all the acquisition objects have the acquisition complete flag set to "Y." If all the acquisition objects have the acquisition complete flag set to "Y", the acquisition process is terminated. If any of the acquisition objects have the acquisition complete flag set to "N", the information acquisition process control unit returns to S1003 and starts acquisition of information concerning the remaining acquisition objects. This is repeated until all the acquisition objects have the acquisition complete flag set to "Y".

Moreover, S1002 to S1005 handle information which may be displayed next by a user input signal on the currently displayed screen and are started without waiting for a user input signal. Thus, it is possible to start acquisition of information prior to the user input signal, thereby enabling look-ahead acquisition.

As has thus far been described, the information processing device 1 can acquire by look-ahead, not only the currently displayed information but also information to be displayed on the screen by an input signal to be inputted later.

Moreover, by using the information acquisition managing table 15, it is possible to perform look-ahead acquisition by selecting information.

Moreover, when the current screen display information managing table 17 is updated according to an input signal, the data stored in the information-acquired data storage unit 20 is called by the screen display control unit 18 if necessary. The screen display control unit 18 generates screen display information by using the screen configuration information stored in the screen configuration information managing table 16 and the called data. The screen display information is transmitted to the screen display unit 19. The screen display unit 19 updates the display screen by using the screen display information.

By the aforementioned look-ahead process and the screen display process, it is possible to switch the screen display with a small delay time.

It should be noted that when the look-ahead process is started by a screen configuration modification signal inputted from the input unit 12, the respective information pieces stored in the information aquisition managing table 15 in the step S 1002 (such as the type of the acquisition information stored in the column 701 and the number of information pieces stored in the column 705) may be modified in accordance with the screen configuration to be modified. The modification of various information pieces to be stored is set by the information acquisition process control unit 13 according to the screen configuration information such as the number of display items stored in the screen configuration information managing table 16. By modifying the number of acquisition items according to the screen configuration, it is possible to improve the efficiency of information acquisition.

Figure 11:
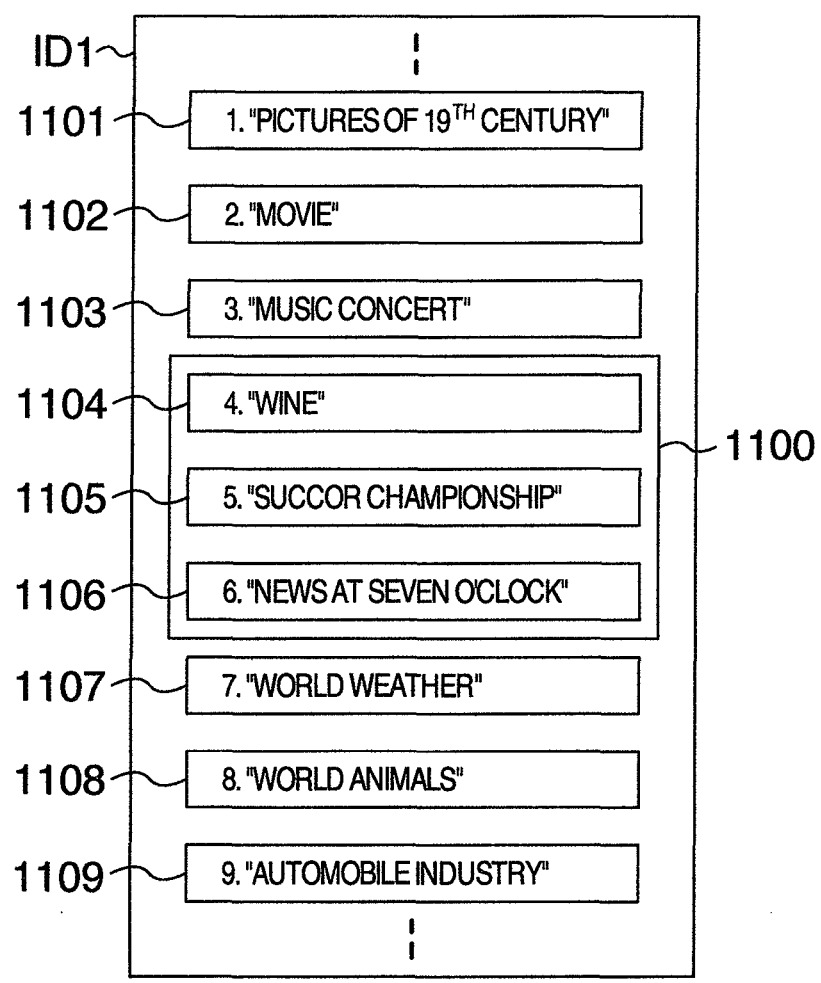
FIG. 11 is an explanatory diagram showing an example of a look-ahead object according to the embodiment of the present invention.

Next, explanation will be given on the method for selecting information as a look-ahead object according to the present embodiment. In FIG. 11, ID 1 denotes an information list, 1101 to 1109 denote information pieces contained in the list ID 1, 1100 denotes a portion of the list ID 1 displayed on the screen. Here, the portion 1100 corresponds, for example, to a list displayed areas 211 to 217 in FIG. 2 or in the areas 611 to 616 in FIG. 16. In this embodiment, among the information pieces of the lists shown in FIG. 11, information pieces 1104, 1105, and 1106 are displayed. While this display is performed, the information acquisition control unit 13 selects the information pieces 1102, 1103, 1107, and 1108 as look-ahead object information pieces and acquires them by the aforementioned flow.

Thus, for example, before the direction button 803 or 804 of the controller 800 in FIG. 8 is pressed, the information pieces 1102, 1103, 1107, and 1108 are acquired. For this, information can be displayed with a small delay time. The information piece 1101 and the information piece 1109 may be acquired by using the time while the information pieces 1102, 1103, 1107, and 1108 are displayed.

Here, if the entire data amount of the list ID 1 is too large and the entire list is acquired, a load is applied on the server device 3 and the information transmission network 2. However, in this selection method of the present embodiment, only the information pieces required next are selectively acquired. Thus, it is possible to reduce the load on the information transmission of the server device 3 and the information transmission network 2 and reduce the delay time of the information display.

It should be noted that in this embodiment, two information pieces in each of the upward and downward scroll directions are made look-ahead objects. However, the look-ahead information amount may be modified considering the load of the information transmission or the like. Moreover, the scroll may be performed not only upward and downward but also rightward and leftward. Moreover the list to be scrolled may be thumbnails as shown in FIG. 6 instead of a text. Moreover, it is possible to scroll the entire display portion of a list like page turning instead of scrolling one by one item in the list when a scroll instruction signal is inputted. For example, in this case, at least page portion is selected as a look-ahead object and acquired. In this case, when the page is switched, the display delay can be further reduced. More specifically, assume that in FIG. 11 three information pieces can be displayed. If information pieces 1104, 1105, and 1106 are currently displayed, the information pieces 1101, 1102, 1103, 1107, 1108, 1109 are selected as the look-ahead information pieces. Thus, if the upward direction scroll instruction signal (page turning instruction signal) is inputted, the information pieces 1101, 1102, 1103 are displayed with a small display time. Moreover, if the downward direction scroll instruction signal (page turning instruction signal) is inputted, the information pieces 1107, 1108, 1109 are displayed with a small display time. Here, the information pieces upper than the information piece 1101 and the information pieces lower than the information piece 1109 in the list may be acquired by setting them as look-ahead objects after the scroll instruction signal is inputted.

The aforementioned example of look-ahead acquisition uses the characteristic document of the markup language capable of setting the element type. That is, a necessary amount of information pieces identified by an identifier such as ID associated with each element is selected and requested to be acquired.

In the embodiment thus far explained, the information processing device can display a new information piece not displayed on the screen can be displayed with a small delay time after an input signal instructing scroll is received from a user. Moreover, it is possible to reduce the transmission load of the server device and the information transmission network.

Description will now be directed to a second embodiment of the present invention.

The second embodiment employs a different method for selecting an information piece as a look-ahead object by the information acquisition processing control unit 13 in the first embodiment.

Explanation will be given on the look-ahead object selection method of this embodiment with reference to FIG. 12. In FIG. 12, ID 1 is a list containing the information pieces currently displayed on the screen. In this list ID 1, the portion 1200 is displayed on the screen. The portions 1200 contains information pieces 1210, 1211, 1212. Here, the portion 1200 corresponds to the areas 211 to 217 in the display screen of FIG. 2 and the areas 611 to 616 in the display screen of FIG. 6.

Moreover, the information pieces 1210, 1211, 1211 are correlated to information lists ID 11, ID 12, ID 13 as link destination information when the information pieces are selected, respectively. Here, these IDs are registered in the display-upon-selection ID of the current screen display information managing table 17. That is, for example, when the information piece 1210 is selected on the current display screen, a list of ID 11 is displayed on the display screen. Here, in the example of this figure, 1201 in the list ID 11 is a portion displayed and the information pieces 1212, 1213, 1214 are objects to be displayed. Similarly, when the information piece 1220 in the list ID 1 is selected, a portion 1202 (information pieces 1222, 1223, 1224) of the list ID 12 is displayed. Moreover, similarly, when the information piece 1220 in the list ID 1 is selected, a portion 1202 (information pieces 1232, 1233, 1234) of the list ID 12 is displayed.

Here, when the current screen display displays a portion 1210 of the ID 1, the information acquisition process control unit 13 in this embodiment selects information pieces 1212, 1213, 1214, 1222, 1223, 1224, 1232, 1233, 1234 in the information acquisition process managing table 15 and registers them as look-ahead objects. While the current screen display displays the portion 1210 of the ID 1, the look-ahead acquisition of then is started, and they are stored in the information-acquired data storage unit 20. Thus, acquisition of the list of the link destination is started before one of the currently displayed information pieces 1210, 1211, 1212 is selected by an input signal inputted by the user. Accordingly, it is possible to display the next information piece with a small delay time.

Here, when acquiring the acquisition objects of the aforementioned example, it is possible to acquire the information pieces in the order of 1212, 1213, 1214, 1222,1223, 1224, 1232, 1233, 1234. In this case, however, if the information piece 1230 of the currently displayed screen is selected during acquisition communication of the information pieces 1212 to 1223, the information pieces 1232, 1233, 1234 are not acquired. Accordingly, in order to display the portion 1203 of the ID 13, it is necessary to acquire the information pieces 1232, 1233, 1234 from the server device 3 after the selection. Consequently, a delay is caused when switching the display.

To cope with this, it is more preferable that the information acquisition process control unit 13 of the present embodiment register the data so as to acquire the information pieces in the order of, for example, 1212, 1222, 1232, 1213, 1223, 1233, 1214, 1234 when registering the acquired information in the information acquisition processing managing table 15.

Here, for example, assume that the information pieces 1212, 1222, 1232,1213, 1223, 1233 have been acquired. Even if the information piece 1230 of the currently displayed screen is selected at this stage, the information pieces 1232, 1233 are already acquired. For this, only the information piece 1234 should be acquired from the server device 3 for displaying the portion 1203 of ID 13.

Accordingly, in the information acquisition in the latter order, the information amount to be acquired after selection of the information piece 11230 is smaller than in the acquisition of the information in the former order. Consequently, it is possible to further reduce the delay of the information display.

That is, in the former order of information acquisition, a portion of display of a particular list among a plurality of lint destination lists is completely acquired before starting acquisition of the list of the next link destination. On the other hand, in the latter order of information acquisition, a certain amount of a not-yet-acquired portion of a list portion of a particular link destination is acquired from its head and a certain amount of a not-yet-acquired portion of a list portion of the next link destination is acquired from its head. This procedure is repeated for each of the links. Here, the list acquired does not include all but only a certain amount. For this, acquisition of information of the link destination is not completed by looping back the links displayed on the screen. A partial acquisition of the list of the link destination is repeatedly performed for the link displayed on the screen. Thus, by acquiring the information of the link destination, it is possible to further reduce the delay time of the information display.

It should be noted that when acquiring a part of the list of a plurality of link destinations, for example, it is possible to repeat request and response reception, i.e., request for acquisition of the information piece 1212, receive the information piece 1212, request for acquisition of the information piece 1222, receive the information piece 1222, request for acquisition of the information piece 1232, and receive the information piece 1232. Moreover, it is also possible to request for acquisition of the information piece 1212 and request for acquisition of the information pieces 1222 and 1232 without waiting for reception of the information piece 1212, and receive the information pieces 1212, 1222, 1232. Then, a request is made for acquisition of the information piece 1213 and a request is made for acquisition of the information pieces 1223 and 1233 without waiting for reception of the information piece 1213. After this, the information pieces 1213, 1223, 1233 are received. In this case, the number of times for waiting for reception of a response from the server device 3 is reduced and it is possible to further reduce the delay time of the information display.

According to the embodiment thus described, the information processing device can display new information not displayed on the screen with a small delay time after receiving an input signal instructing the selection of information display from a user. Moreover, her, it is possible to reduce the transmission load of the server device and the information transmission network.

Description will now be directed to a third embodiment of the present invention.

The third embodiment employs a different method for selecting an information piece as a look-ahead object of the information acquisition process control unit 13 in the first embodiment.

Referring to FIG. 2, explanation will be given on the look-ahead object information selecting method performed by the information acquisition processing control unit 13 of the present embodiment.

In the display screen of FIG. 2, as has been described above, an list of information pieces is displayed in the area 210. Among the information pieces displayed in the area 210, for example, the area 214 is highlighted by changing the color. Detailed information of this information piece is displayed in the area 230 and an image associated with the information piece is displayed in the area 250. Here, for example, if the user presses the direction button 803 or 804 of the controller 800, the highlighted information piece in the list of the area 210 is shifted upward or downward. For example, the information pieces displayed in the area 230 and the area 250 are switched to detailed information and the associated image of the information piece one-step upper or lower than the information piece displayed in 214 of the FIG. 2.

Here, in order to reduce the delay time of display of information upon display switching, it is necessary to acquire in advance the detailed information and the associated image of the information pieces of the list displayed in the area 210. However, if detailed information and the associated images of all the information pieces in the list are to be acquired in the advance, a large amount of information should be acquired and the transmission loads of the server device 3 and the information transmission network 2 are increased. To cope with this, the information acquisition process control unit 13 of the present embodiment selects as a look-ahead acquisition object, detailed information and an associated image to be displaced in the adjacent area to the information piece whose detailed information and associated image are currently displayed. More specifically, in the example of the display screen of FIG. 2, while the detailed information and the associated image of the information in the area 214 are displayed, the detailed information and the associated images of the information pieces in the areas 213 and 215, for example, are selected as look-ahead objects.

Thus, by starting acquisition of the detailed information before a request is made by a user input signal for display of the detailed information, it is possible to display the detailed information with a small delay time.

Here, the information to be made a look-ahead object is not limited to only one upper and lower information piece. It is possible to set two upper information pieces and two lower information pieces such as the areas 212,213 and the areas 215, 216. Moreover, the information as the look-ahead object may not be adjacent to the information whose detailed information and associated image are currently displayed. Any information whose detailed information and associated image which can be displayed by an input signal inputted by the user may be the look-ahead object.

According to the aforementioned embodiment, the information processing device can display new detailed information and associated information currently not displayed on the screen with a small delay time after receiving an input signal instructing selection of information display by the user. Moreover, it is possible to reduce the transmission loads of the server device and the information transmission network.

Description will now be directed to a fourth embodiment of the present invention.

The fourth embodiment employs a different method for selecting information as a look-ahead object by the information acquisition process control unit 13 in the second embodiment.

In the second embodiment, the information acquisition process control unit 13 partially selects the information of the link destination of the currently displayed information. Here, the fourth embodiment relates to a look-ahead object information selecting method when the input unit of the information processing device 1 in the second embodiment includes a signal for instructing modification of display information independently of the information displayed on the display screen. The method will be detailed below.

In the look-ahead object information selecting method in the second embodiment, for example, FIG. 2 shows a case that the information acquisition process control unit 13 partially selects information in the link destination of the information pieces displayed in the areas 211 to 217. On the other hand, in the fourth embodiment, the information acquisition process control unit 13 further selects as a look-ahead object, a part of the information displayed on the screen and stores it in the information acquisition process managing table 15 when a user presses the aforementioned screen switching button 805, or a video list button 806, a music list button 807, and a photo list button 808 as direct list modification buttons among the buttons of the controller shown in FIG. 8.

If this acquisition is performed before the button is pressed, it is possible to reduce the delay time of the display modification when the screen display is modified by the input signal when the button is pressed.

The input signal generated when one of these buttons is pressed modifies the information displayed on the screen regardless of the information currently displayed on the screen. For this, it is preferable that the information acquisition process control unit 13 acquires by look-ahead the display information after the display modification regardless of the information currently displayed on the screen.

Thus, prior to the information display request made by the user input signal, acquisition of the display information is started and the information can be displayed with a small delay time after the input signal is received.

Moreover, the information amount to be acquired is only the information to be displayed on the screen after the display modification. Moreover, the information amount setting may be modified by considering the transmission loads of the server device and the information transmission network.

According to the aforementioned embodiment, even when a signal for modifying information displayed on the screen regardless of the information displayed on the screen is inputted, the information processing device can perform display with a small delay time after receiving the input signal instructing to select the information display from the user. Moreover, it is possible to reduce the transmission loads of the server device and the information transmission network.

Description will now be directed to a fifth embodiment of the present invention.

The fifth embodiment employs a different method for selecting information as a look-ahead object of the information acquisition process control unit 134 in the second embodiment.

In the second embodiment, the information acquisition process control unit 13 partially selects the information in the link destination of the currently displayed information. Here, the fifth embodiment relates to a look-ahead object information selecting method when the information in the link destination of the currently displayed information is content data.

Hereinafter, explanation will be given with reference to FIG. 6. For example, assume that the link destinations of the thumbnails shown in the areas 611 to 616 in FIG. 6 are respectively video content data. Here, the thumbnail 617 displayed in the area 612 is highlighted by an emphasizing frame and detailed information concerning the thumbnail shown in the 612 is displayed in the area 630. Here, if the user inputs an input signal to confirm the selection, video data linked to the thumbnail displayed in the area 612 is reproduced.

Here, if the video data has not been acquired by look-ahead, it is necessary to acquire data from the server device at this stage. This causes a delay time until the reproduction display of the video is started. For this, it is preferable that the content data in the link destination of the information piece displayed on the screen be a look-ahead object. However, the user may not confirm the selection at the stage of FIG. 6. The user may shift the emphasis frame 617 from the area 612 to the area 611 or the area 613 or the area 615. In such a case, even if all the video data in the link destination of the area 612 are acquired, they are not displayed in the end and the load on the communication network generated by the reception process and the received data become useless.

To cope with this, in the fifth embodiment, the information acquisition process control unit 13 partially selects as a look-ahead acquisition object, the content data in the link destination of the displayed information. For example, in FIG. 6, for the video data in the link destination of the area 612, only a certain portion of the head of the data stream of the video data is selected as a look-ahead object. For example, when the video data is based on the standard of the MPEG-2, MPEG-4, or H.264, data on a particular number of GOPs (Group of Picture) from the beginning of the stream is selected as a look-ahead acquisition object. The information acquisition process control unit 13 acquires the data and waits for a user input signal. In this case, when the user inputs a signal to confirm the reproduction, the head of the video data has been acquired. Accordingly, there is no need of acquiring the data from the server device 3 upon starting reproduction. This reduces the delay time until the video reproduction display is started. Here, if the selection of the area 612 is confirmed, the video data which has been acquired by look-ahead is reproduced firstly and the remaining data can be acquired while the reproduction is performed. Moreover, even if the area 612 is not selected, the data amount is smaller than the data amount when all the video data is acquired. Accordingly, in either case, it is possible to reduce the transmission load of the server device 3 and the information transmission network 2.

Thus, acquisition of the display information is started before a request for information reproduction start is made by a user input signal, and reproduction can be started with a small delay time after the input signal is received.

Moreover, here, it is possible to partially select the video data in the link destination of the areas 611, 613, 615 as a look-ahead acquisition object. In this case, even if the user changes the position of the emphasis frame 617 and selects the area 611, the area 613, or the area 615, the video data has been partially acquired by look-ahead. Accordingly, it is possible to reduce the delay time until the video reproduction display is started.

Moreover, here, in the case of FIG. 6, the emphasis frame 617 emphasizes the area 612. For this, the area 612 has the highest possibility to be selected to reproduce the video content in the link destination by the user. The areas 611, 613, 615 adjacent to the area 612 have the next highest possibility. The areas 614, 616 far from the area 612 have the lowest possibility.

Accordingly, when the content data to be linked to the information displayed on the screen is made to be a look-ahead object, it is preferable to set a greater amount of the content data in the link destination of the information which is highlighted by a cursor such as the current emphasis frame or changing the display color and which is to be acquired by look-ahead than the other information. That is, in the example of FIG. 6, when the look-ahead acquisition information amount of the video data in the link destination of the area 612 is 100, the look-ahead acquisition information amount of the video data in the link destination of the other area may be set to 50. Furthermore, it is possible to set 50 for the look-ahead acquisition information amount of the video data in the link destination of the areas 611, 613, 615 and 25 for the look-ahead acquisition information amount of the video data in the link destination of the areas 614 and 616. Thus, it is possible to acquire look-ahead, a greater amount of the content data information having a higher possibility to be reproduced by the user. Accordingly, it is possible to reduce the delay time of the content data reproduction display and appropriately reduce the transmission loads of the server device 3 and the information transmission network 2.

The aforementioned explanation has been given on acquisition of a particular number of GOPS (Group of Picture) from the head of a stream when the video data in the link destination is video data based on the standard of the MPEG-2, MPEG-4, H.264. The partial acquisition unit may be, for example, a video packet unit or a frame unit.

Moreover, when the video data in the link destination is data based on the audio standard such as MP3, AAC, and LPCM, it is possible to select a particular number of partial units from the stream header as the look-ahead acquisition object.

Moreover, when the video data in the link destination is data based on the image standard such as JPEG and GIF, it is possible to select a particular number of block units or tile units from the stream header as the look-ahead acquisition object.

In any of the cases, it is possible to acquire data by using any unit if data can be partially acquired by look-ahead.

According to the embodiments thus far been described, the information processing device can display the content data not displayed on the screen with a small delay time after receiving an input signal instructing selection of the information display from the user. Moreover, it is possible to reduce the transmission loads of the server device and the information transmission network.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing device connected to other information processing device via a network and comprising:
   a display unit;
   a storage unit;
   an information acquisition process control unit; and
   a communication unit;
   wherein the storage unit holds screen configuration information concerning arrangement of a plurality of information pieces displayed on the display unit;
   the information acquisition process control unit selects an information piece from among the plurality of information pieces which are not displayed on the display unit by referencing the screen configuration information and transmits to the communication unit a signal instructing acquisition of the selected information piece; and
   the communication unit acquires the selected information from the other information processing device based on the instruction signal,
   wherein the communication unit includes information described in a markup language capable of setting an element type of an element in a document; and
   the information acquisition process control unit specifies and selects an element type of information to be acquired by referencing the screen configuration information,
   wherein the device further comprising a screen display control unit for generating display screen information for performing display on a display screen of the display unit;
   wherein the screen display control unit generates display screen information by using the screen configuration information and information acquired from the other information processing device by the communication unit via the network;
   an input unit;
   wherein the information described by the markup language acquired by the communication unit includes character information and image information;
   the display screen displayed according to the display screen information displays a partial range of a content including the arrangement of the character information or the image information and a list of contents, one of which is currently displayed on the screen;
   before the input unit transmits a signal for modifying the displayed range of the arrangement of the information to the screen display control unit,
   the information acquisition process control unit specifies and selects an element type of information of the contents arranged at a position nearest to the currently displayed content on the list of contents at least among the contents not displayed on the display screen among the contents on the contents list, and transmits an acquisition instruction signal of the selected contents information to the communication unit; and
   the communication unit acquires a part of the information from the other information processing device based on the instruction signal.

* * * * *